Sept. 11, 1951   C. H. J. BEAVEN ET AL   2,567,269
THERMIONIC VALVE OSCILLATOR
Filed April 5, 1949

INVENTORS
Clifford Henry James Beaven
Kenneth Montague Caple
Hugh Alexander Dell
By Fred M. Vogel
AGENT Patented Sept. 11, 1951

2,567,269

UNITED STATES PATENT OFFICE 2,567,269

THERMIONIC VALVE OSCILLATOR

Clifford Henry James Beaven, Woodmansterne, Kenneth Montague Caple, London, and Hugh Alexander Dell, Banstead, England, assignors to Hartford National Bank and Trust Company, Hartford, Conn., as trustee Application April 5, 1949, Serial No. 85,648
In Great Britain August 30, 1947

6 Claims. (Cl. 250—36)

This invention relates to thermionic valve oscillators of the resistance-capacity type.

It is an inherent feature of all low-frequency resistance-capacity oscillators which are tuned by means of a small variable condenser that the oscillator output point of the frequency discriminating network is of high resistance and high reactance. This feature is a disadvantage in that stray capacities lead to reduced frequency coverage with a given variable condenser and involve the use of a frequency scale which is not simply calculable.

In addition in coupling the oscillator output point to a valve amplifier difficulty may arise in that the maximum permissible input resistance of the valve amplifier is exceeded.

The object of the present invention is to provide a circuit-arrangement in which the above difficulties are substantially avoided. A further object of the present invention is to provide an oscillator the output of which is stabilised in amplitude, and substantially independent of valve characteristics.

According to the invention a thermionic valve oscillator comprises a frequency discriminator network for determining the frequency of the generated oscillations, the network having a pair of series connected arms so arranged that out-of-phase potentials are developed across the ends of the network, the potentials being of such magnitude relative to earth potential that the junction point of the arms of the network has a potential which is low relative to the said out-of-phase potentials.

According to a further feature of the invention a thermionic valve oscillator as set forth in the preceding paragraph comprises means for applying negative feedback to the oscillator valve such that the amount of feedback is dependent on the amplitude of the output of the oscillator.

Further features of the invention will be apparent from the following description which is given by way of example and with reference to the accompanying drawings, in which.

Figure 1:
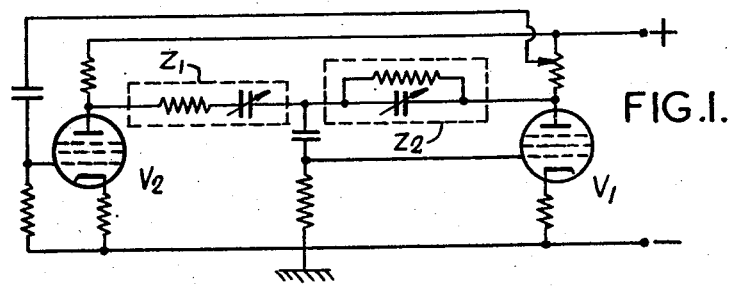
Figure 1 shows a circuit diagram of a thermionic oscillator according to the invention.

Referring now to Figure 1, $Z_1$ and $Z_2$ are arms of a frequency discriminating network and an A. C. signal is supplied by the oscillator valve $V_2$ which is backcoupled to the anode of an amplifier valve $V_1$. It is an inherent property of such a circuit that if a given A. C. signal is supplied between the anode of valve $V_2$ and earth, a signal will be developed between the anode of valve $V_1$ and earth of opposite sense and of a magnitude depending on the ratio of $Z_1$ to $Z_2$, if the gain of $V_1$ is high. The signal at the anode of valve $V_1$ will then be largely independent of the gain of valve $V_1$ and the potential above earth at the oscillator output point between the junction of $Z_1$ and $Z_2$ will be small i. e. approximately equal to the signal at the anode of valve $V_1$ divided by the stage gain of the valve $V_1$. Preferably the network $Z_2$ is a parallel network since it is the lower impedance so that assuming a given gain of valve $V_1$ and a given voltage at the anode of valve $V_2$ the signal at the junction of $Z_1$ and $Z_2$ will be smaller. In addition, it is desirable to shunt the anode load of valve $V_1$ as little as possible and the output from the oscillator/amplifier circuit is therefore better obtained from the anode of $V_2$.

In a circuit-arrangement according to Figure 1 it was found that using a standard two gang variable air condenser of the type normally used in commercial radio receivers, a satisfactory frequency coverage of at least 20:1 was obtained whereas in existing circuits the ratio is restricted to about 10:1. The grid leak for the amplifier valve $V_1$ may be as low as 1 megohm although the resistors in the frequency discriminating network $Z_1$ and $Z_2$ are of the order of ten times this value.

Figures 2, 3:
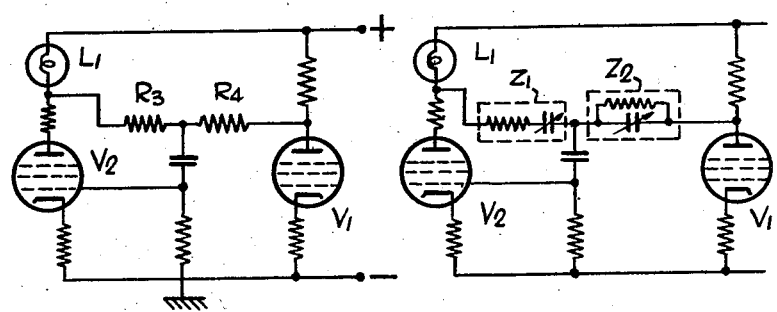
Figures 2 and 3 show modifications of the circuit of Figure 1.

In order to stabilise the amplitude of the oscillator output independently of valve characteristics it is convenient to provide a circuit-arrangement such as that shown in Figure 2. In this arrangement comprising valves $V_1$ and $V_2$, resistances $R_3$ and $R_4$ and a lamp $L_1$, the proportion of negative feedback applied to the grid of valve $V_2$ is dependent on the amplitude of the signal developed at its anode since the resistance of the lamp $L_1$ increases with applied signal.

The resistors $R_3$ and $R_4$ may be replaced by frequency discriminating networks $Z_1$, $Z_2$ as shown in Figure 3, in which case the inherent frequency stability and waveform is improved.

Figure 4:
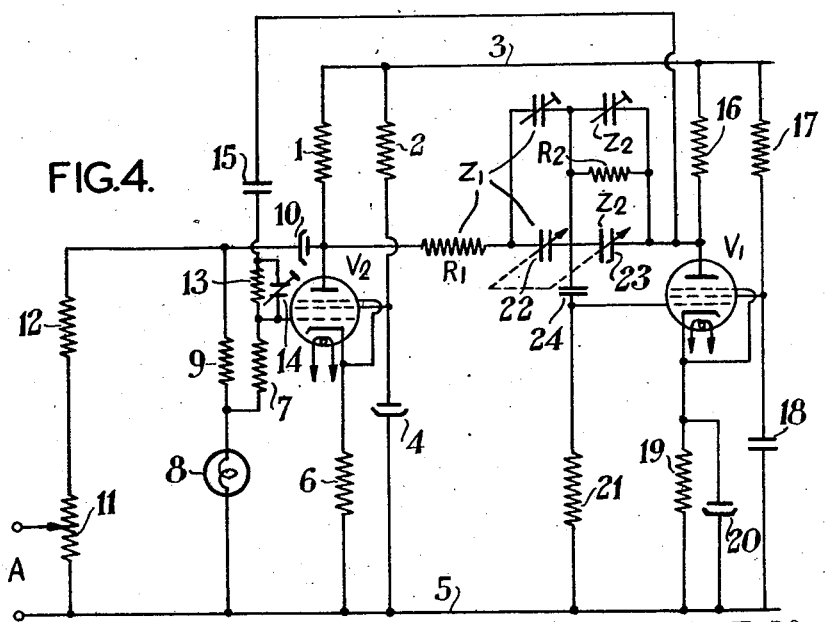
Figure 4 shows a practical embodiment of the invention.

A practical embodiment of the invention is shown in greater detail in Figure 4 in which circuit arrangement the control characteristics are further improved by ensuring that only A. C. is passed through the lamp $L_1$.

The pentode oscillator valve $V_2$ is of the type designated EL33 and the high slope pentode amplifier valve $V_1$ is of the type designated EF37. The anode $V_2$ is connected through resistor 1 of 6.8 k. ohms to the positive pole of a 250 volt H. T. source (not shown), the screen grid being connected through a resistor 2 of 47 k. ohms to the H. T. positive line 3. The usual voltage stabilising capacitor 4 of 32 μF. is connected between the screen of the H. T. negative line 5. The cathode (and suppressor grid) is connected through self bias resistor 6 (150 ohms) to the line 5.

The control grid is connected through grid resistor 7 and lamp 8 (230 volts, 15 watts) to the line 5 and the junction of this resistor with the lamp is connected through resistor 9 of 5 k. ohms to one pole of capacitor 10 (32 μF.) the other pole of which is connected to the anode of V₂. The output of the oscillator is taken from the junction of resistor 9 and capacitor 10, the output appearing across the slider of potentiometer 11 5 k. ohms) and line 5 (terminals A), the potentiometer being connected through the resistor 12 of 6.8 k. ohms to the resistor 9.

The control grid of valve V₂ is also connected through resistor 13 (shunted by preset capacitor 14) and capacitor 15 of 0.5 μF. to the anode of valve V₁ which is in turn connected through load resistor 16 to the H. T. line 3. The screen grid of valve V₁ is energised through resistor 17 of 220 k. ohms from line 3 and the usual capacitor 18 (0.5 μF.) is included between this grid and line 5. The cathode of valve V₁ is joined to line 5 through bias resistor 19 (1.5 k. ohms) by-passed by capacitor 20 (2.5 μF.). A grid resistor 21 of 3.3 m. ohms is connected between the control grid of V₁ and line 5, the grid being also connected through capacitor 24 (0.22 μF.) with the junction of the impedance networks Z₁ and Z₂ previously described.

The network Z₁ comprises resistor R₁ having one end connected to the anode V₂ and one section 22 of a normal 2-gang variable capacitor (14–470 pF.) as commonly used in radio receivers, to the fixed vanes of which the other end of resistor R₁ is joined. The network Z₂ comprises the second section 23 of the gang capacitor with resistor R₂ in parallel. The section 23 has its fixed vanes connected to the anode of valve V₁, the moving vanes of both capacitor sections 22 and 23 being connected to the control grid of valve V₁ through the capacitor 24. Variable (preset) trimmer capacitors of 3–30 pF. are shunted across each section 22, 23.

The above described oscillator is adapted to cover the range of frequencies extending from 30 C. P. S. to 100,000 C. P. S. in three ranges depending on the values of resistors R₁ and R₂ as shown in the following table:

| R₁ and R₂ | Frequency range |
|---|---|
| 10 m. ohms | 30–600 C. P. S. |
| 0.5 m. ohms | 600–10,000 C. P. S. |
| 50 k. ohms | 5,000–100,000 C. P. S. |

If desired, switching arrangements may be provided to bring in the required resistors to enable the oscillator to cover the wanted frequency range.

The above described embodiments are given by way of example only since modifications may be made to suit any particular circumstances as they arise in practice. It will be clear that the circuit arrangements shown in Figures 2 and 3 will also show improved performance if the lamp L₁ is parallel-fed as shown in Figure 4.

We claim:
1. A resistance-capacitance oscillation generator comprising an oscillator stage provided with a first electron discharge tube having a cathode, a grid and an anode, an amplifier stage provided with a second electron discharge tube having a cathode, a grid and an anode, a frequency-discriminating network connected between the anodes of said first and second tubes and constituted by first and second serially-connected impedance arms, means to couple the junction of said arms to the grid of said second tube, and means regeneratively to couple the anode of said second tube to the grid of said first tube to sustain oscillations in said oscillator stage, said second arm having an impedance value with respect to said first arm at which the magnitude of voltage developed at said junction relative to ground is small as compared to that developed at the anode of said second tube.

2. An arrangement as set forth in claim 1 further including a negative feedback circuit coupled between the anode and grid of said first tube to provide feedback to an extent depending on the amplitude of the oscillation output of the oscillator stage.

3. A resistance-capacitance oscillation generator comprising an oscillator stage provided with a first electron discharge tube having a cathode, a grid and an anode, an amplifier stage provided with a second electron discharge tube having a cathode, a grid and an anode, a frequency discriminating network connected between the anodes of said tubes and constituted by first and second serially-connected impedance arms, said first arm being formed by a condenser in series with a resistance, said second arm being formed by a condenser in parallel with a resistance, means coupling the junction of said arms to the grid of the second tube, and means regeneratively coupling the anode of said second tube to the grid of the first tube.

4. An arrangement as set forth in claim 3 wherein the condensers in said first and second arms form individual sections of a variable, ganged capacitor.

5. An arrangement as set forth in claim 3 wherein the resistances in said first and second arms are of like value.

6. An arrangement as set forth in claim 3 further including a negative feedback circuit in said oscillator stage provided with an incandescent lamp connected in the anode circuit of said first tube to develop a feedback voltage depending on the intensity of oscillations produced in said stage, and means to apply said feedback voltage to the grid of said first tube.

CLIFFORD HENRY JAMES BEAVEN.
KENNETH MONTAGUE CAPLE.
HUGH ALEXANDER DELL.

REFERENCES CITED

The following references are of record in the file of this patent:

UNITED STATES PATENTS

| Number | Name | Date |
|---|---|---|
| 2,268,872 | Hewlett | Jan. 6, 1942 |
| 2,303,862 | Peterson | Dec. 1, 1942 |
| 2,346,396 | Rider | Apr. 11, 1944 |
| 2,444,084 | Artzt | June 29, 1948 |